United States Patent [19]

Sakaguchi et al.

[11] Patent Number: 5,004,884
[45] Date of Patent: Apr. 2, 1991

[54] METHOD OF SUBMERGED ARC WELDING A THICK STEEL PLATE WITH LARGE HEAT INPUT AND SUBMERGED ARC WELDING FLUX

[75] Inventors: Shuichi Sakaguchi; Tadamasa Yamaguchi; Itaru Yamashita, all of Chiba, Japan

[73] Assignee: Kawasaki Steel Corporation, Kobe, Japan

[21] Appl. No.: 454,920

[22] Filed: Dec. 22, 1989

[30] Foreign Application Priority Data

Dec. 28, 1988 [JP] Japan ................................ 329458

[51] Int. Cl.$^5$ .............................................. B23K 9/18
[52] U.S. Cl. .................................. 219/73; 219/137 R; 219/146.3
[58] Field of Search ................ 219/137 R, 73, 73.2, 219/146.3, 146.31

[56] References Cited

U.S. PATENT DOCUMENTS

| | | | |
|---|---|---|---|
| 1,532,842 | 4/1925 | Stresau | 219/137 R |
| 3,932,200 | 1/1976 | Miyano et al. | 219/73 |
| 4,041,270 | 8/1977 | Akahide et al. | 219/73 |
| 4,196,335 | 4/1980 | Ikeda et al. | 219/73 |
| 4,363,951 | 12/1982 | Shiga | 219/73 |

Primary Examiner—Clifford C. Shaw
Attorney, Agent, or Firm—Dvorak and Traub

[57] ABSTRACT

A method of submerged arc welding of thick steel plates with a large heat input and flux for submerged arc welding which comprises: forming a groove having a multi-angle shape which has at least two different angular inclination when a single side submerged arc welding for perfect penetration is conducted under a condition of an welding heat input of 100 to 1000 kJ/cm; using submerged arc welding flux $SiO_2$: 5 to 28% by weight, MgO: 15 to 35% by weight, CaO: 5 to 15% by weight, $CaF_2$: 2 to 20% by weight, $Al_2O_3$: 5 to 15% by weight, and $TiO_2$: 2 to 10% by weight as the main components, and containing iron powder by 30% by weight or less and either or both of Si and Mn in the metallic form by 10% by weight, the submerged arc welding flux having a particle size distribution arranged such that the proportion of the particle size distribution arranged such that the proportion of the particle which have a size finer than 36 mesh is 20% by weight or less and the proportion of the particles which have a size 14 mesh or finer but 36 mesh or rougher is 60% by weight or more; and conducting the welding.

3 Claims, 6 Drawing Sheets

METHOD OF SUBMERGED ARC WELDING A THICK STEEL PLATE WITH LARGE HEAT INPUT AND SUBMERGED ARC WELDING FLUX

BACKGROUND OF THE INVENTION

1. Field of the Invention

The present invention relates to a method of submerged arc-welding of a thick steel plate having a thickness exceeding 30 mm with a large heat input.

2. Description of the Background Art

Recently, steel plates having a thickness exceeding 30 mm have been used as the building structural members, especially as structural members for high rise buildings.

When the thick steel plates having thicknesses exceeding 30 mm are welded, joints having good appearance, and no internal defects should be produced without difficulty. In order to meet this goal, a method has been usually employed using underlay $CO_2$-welding. However, the underlaying $CO_2$-welding needs a lot of time and labors, this method is not suitable for welding a large quantity of thick building structural members.

In order to conduct welding with high efficiency, it is preferable that joints be formed by one pass/single layer welding with a large heat input, for example, 100 KJ/cm. If the above cannot be conducted because the thickness of the plate exceeds a certain limit, it is preferable that a multiplicity of passes/single layer welding or multi-layer welding be conducted.

It has been disclosed in Japanese Patent Laid-Open No. 53-108839 that the quantity of weld deposition is increased by using a flux to which iron powder has been added and using a multiplicity of electrodes with a large heat input for the purpose of one-pass/single layer welding a thick steel plate having a thickness exceeding 35 mm. However, the thickness which can be welded by one-pass has a certain limitation even if the above method is employed Furthermore, as the welding heat input increases, the characteristics of the welded joint are adversely affected On the other hand, when multi-layer submerged arc welding is conducted with a large heat input, the amount of slag increases in proportion to the increase of the heat input, and what is even worse, the slag is difficult to remove. As a result, the removal of slag takes a long time or any remaining slag causes welding defects at the multilayer welding.

In order to overcome the above-described problems, a method has been disclosed in Japanese Patent Laid-Open No. 63-1925593 in which the slag can be readily removed by adding iron powder and adjusting the composition of flux.

However, the multi-layer welding of thick steel plates cannot be conducted efficiently with the above-described method because the thickness of the slag inevitably increases proportionally with the increase in the heat input and the proper heat input region is limited by a groove.

That is, in order to easily remove the slag by the above-described method, the groove angle must be 40. or more. However, it leads to a fact that the cross sectional area of the groove is enlarged excessively in accordance with increase in the plate thickness in the case of the single side welding. As a result, problems arise in that the strength and the toughness of the heat affected zone deteriorates because the heat input is enlarged. On the contrary, if the groove angle is reduced, solidified portions generate cracks because the width is narrowed with respect to the depth of fusion (the height of the penetrated metal) when using the first layer of the multi-layer welding with a large heat input. Because of the problems described above, the multi-layer welding with a large heat input has not been generally used.

SUMMARY OF THE INVENTION

An object of the present invention is to effectively raise the limit in the plate thickness which can be welded by one-pass in the case of one side submerged arc welding of thick steel plates.

Another object of the present invention is to overcome the problems such as the difficulty to remove slag and reduction of cracks generated in the solidified portions taking place while using the multi-layer welding with a large heat input.

A still further object of the present invention is to provide a method capable of efficiently welding and assembling box columns.

According to the present invention, there is provided a method of submerged arc welding thick steel plates with a large heat input which comprises: forming a groove having a multi-angle shape which has at least two different angular inclination when a single side submerged arc welding for perfect penetration is conducted under a condition of a welding heat input of 100 to 1000 kJ/cm.

Furthermore, there is provided a flux for submerged arc welding, the flux comprising:
$SiO_2$: 5 to 28 wt% (5 to 28 % by weight)
MgO: 15 to 35 wt%,
CaO: 5 to 15 wt%,
$CaF_2$: 2 to 20 wt%,
$Al_2O_3$: 5 to 15 wt%, and
as the main components, and containing iron powder (F) by 30% by weight or less and either or both of Si and Mn in the metallic form by 10 % by weight, the submerged arc welding flux having a particle size distribution arranged such that the proportion of the particles having a size which is finer than 36 mesh, is 20 % by weight or less and the proportion of the particles having a size which is 14 mesh or finer but 36 mesh or rougher, is 60 % by weight or more.

DESCRIPTION OF THE PREFERRED EMBODIMENTS

The present invention will now be specifically described.

An aspect of the present invention lies in a multi-angle groove which has sides having at least two different angular inclination. Since the cross sectional area of the groove at the submerged arc welding of a thick steel plate is decreased, the increase of the heat input can be prevented by using the multi-angle groove according to the present invention. Furthermore, the welding bead width can be made to have a proper size, that is, the cracks generated in the solidified portions can be prevented by arranging the shape of the metal to be welded.

Figure 1:
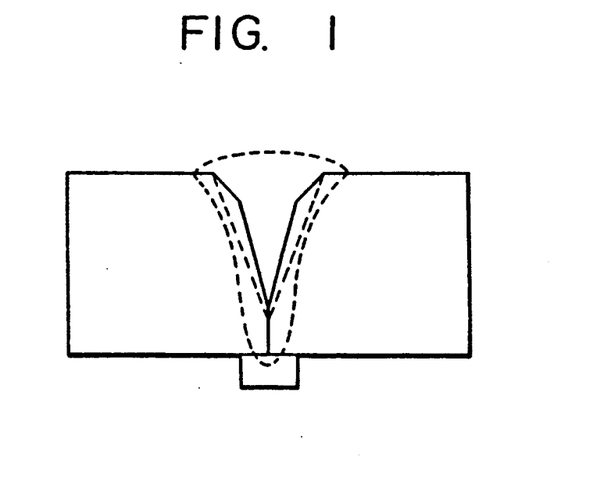
FIG. 1 is a schematic view which illustrates a multi-angle groove according to the present invention.

As shown in FIG. 1, the width of the multi-angle groove according to the present invention is arranged to have the same as that of the conventional groove, but it is arranged to have two or more angles in such a manner that the angle is reduced at the bottom portion thereof and widened in the upper portion thereof. As a result, the cross sectional area of the groove can be reduced and the shape of the metal to be welded can have a shape in which the cracks in the solidified portions can be prevented.

As a result of the thus arranged multi-angle groove, the limit in the thickness of the plate which can be submerged arc-welded by one pass for single layer can be increased. In cooperation with the use of a proper flux to be described later, two 60 mm thick plates can be welded by one pass so that the joint can be produced.

However, if the thickness of the plate is further increased, the increase in the input heat takes place inevitably. Therefore, multi-layer welding is necessary depending upon the plate thickness.

In this case, multi-layer submerged arc welding with a large heat input is employed. However, it is necessary to simultaneously obtain the easy removal of the slag and the production of cracks in the solidified portions.

The use of a groove having two or more angles according to the present invention is significantly effective in terms of satisfactorily reducing the cross sectional area of the groove and enlarging the open area of the groove As a result, the above-described problems associated with multi-layer submerged arc welding with a large heat input can be overcome.

Figure 2:
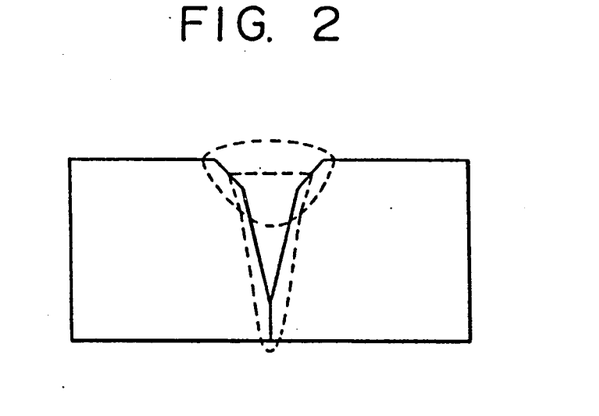
FIG. 2 is a view which illustrates a state of lamination at the time of a two-pass welding operation in which a groove having sides possessing different angular inclination is used.

As shown in FIG. 2, the cross sectional area of the groove can be reduced, and thereby the heat input can be reduced by reducing the angle of the groove at the bottom portion of the groove. As a result, the surface of the bead of the first welding layer can reach the upper position in the groove. Therefore, the shape of the metal to be welded can be arranged so that the cracks in the solidified portions can be prevented. Furthermore, the width in the groove is enlarged so that undercuts taking place in the groove are prevented. As a result, the slag can be removed easily. In the case of the above-described multi-layer welding, an improvement is obtained in the efficiency and prevention of welding defects that the one pass/single layer welding be repeated plural times. The use of the multi-angle groove according to the present invention results in the most significant effect in the case where it is combined with the multi-layer welding.

However, slag can occur between either of the grooves and metal to be welded when multi-pass bead is applied to the inside of the groove when using the one pass/single layer weld bead. In order to prevent, heat input must be reduced. Therefore, the welding above the groove must be conducted when the width of the groove is large enough with respect to the bead width in the case of the cap pass welding or welding with a large heat input. The one pass/single layer welding must be conducted in at least two layers for the purpose of obtaining the desired effect.

Figure 3A:
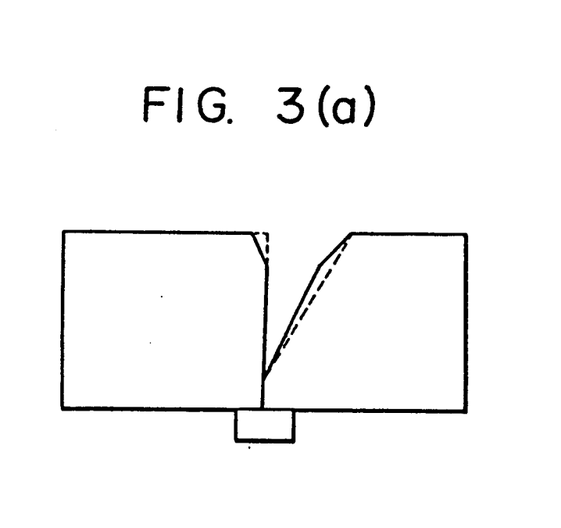
FIGS. 3A and 3B are schematic views which illustrate another embodiment of the multi-angle groove according to the present invention.
Figure 3B:
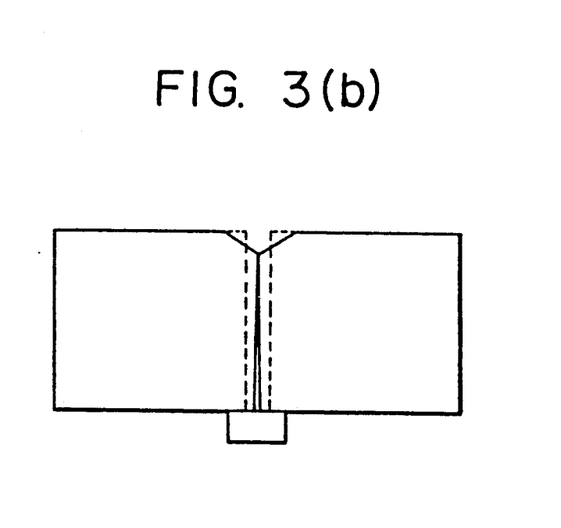

The multi-angle groove according to the present invention is not limited to the V-shaped groove as shown in FIG. 1. It can be effectively employed in the turned V-shape groove and I-shaped groove as shown in FIGS. 3A and 3B.

The flux employed in the present invention must have characteristics which do not cause welding defects in the welding with a large heat input such as the one-pass/single layer welding of a thick steel plate. Furthermore, the flux must have an excellent bead appearance and contributed to easy removal of the slag.

The necessary composition of the flux which can meet the above-described requirements will be described.

$SiO_2$ is an essential component serving as a slag generating agent. If the content of $SiO_2$ is less than 5% by weight, the melting point of the slag generated is raised excessively, what is worse, the viscosity of the slag is lowered, creating the appearance of the bead deteriorate. If it is over 30%, the melting point is lowered, creating the appearance that the bead will easily deteriorate. What is worse, the quantity of oxygen contained in the welding alloy is increased, thereby causing the toughness to deteriorate.

MgO acts effectively to adjust the melting point, and effectively acts to obtain toughness by raising the basicity and thereby reducing the quantity of oxygen contained in the metal to be welded. If the content is less than 15%, the obtainable effect is insufficient. If the content exceeds 35%, the melting point is excessively raised, creating the appearance that the bead will deteriorate.

CaO also acts to raise the melting point, improving the toughness of metal to be welded. If the content is less than 5%, the obtainable effect is insufficient. If it exceeds 15%, slag cannot be easily removed.

$CaF_2$ is capable of raising the basicity without raising the melting point. Therefore, it contributes to adjust the quantity of oxygen in metal to be welded. If it is less than 2%, the effect of the addition is insufficient. If it exceeds 20%, the viscosity is excessively lowered, creating the appearance that the bead will deteriorate.

$Al_2O_3$ is capable of raising the melting point without lowering the viscosity. Therefore, it can be effectively adjust the melting point. If the content is less than 5%, the effect of adjusting the viscosity is insufficient. If it exceeds 15%, the melting point of the slag is excessively raised, creating the appearance that the bead will deteriorate.

$TiO_2$ is capable of effectively adjusting the viscosity without changing the melting point of the slag. Furthermore, it is an element capable of effectively improving the slag removal. If more than 10% is added, the effect does not become better. On the contrary, the appearance of the bead deteriorates.

Iron powder is added for the purpose of improving the welding efficiency since it is capable of increasing the quantity of fusion per the quantity of welding heat input. If more than 30% is added, the appearance of the bead deteriorates.

Si and Mn in the metallic form are necessary elements to provide toughness of the metal to be welded reducing the quantity of oxygen contained in the metal. If either or both of them are added in a quantity exceeding 10%, the oxygen is excessively reduced, causing the toughness to deteriorate. Therefore, it is necessary to add them in a range lower than 10% in accordance with the basicity.

The present invention is not limited to the abovedescribed specific components of the flux. Any other component which is usually used in the flux may be optionally employed.

The other above components are exemplified by BaO, MnO, $B_2O_3$ and alkali metal oxide (for example, $K_2O$, and $Na_2O$). BaO can be contained in a proportion below 5%, MnO can be contained in a proportion below 10%, $B_2O_3$ can be contained in a proportion below 0.5 %, and alkali metal oxide can be contained in a proportion below 5%.

It is a critical factor for the flux according to the present invention, to constitute the above-described composition. Furthermore, it is another critical factor of the present invention to make proper particle size distribution such that the proportion of the components which have particles finer than 36 mesh is 20% by weight or less and the proportion of the components which have particles size 14 mesh or finer but 36 mesh or rougher is 60% by weight or more.

The reason for this lies in that the particle size distribution is a critical factor to satisfactorily remove gas at the time of the welding with a large heat input. In particular, it is important to arrange the size of the particles to be uniform in the case of the first layer at the time of the multi-layer welding with a large heat input in which the gas discharging direction is narrowed by the groove.

If the proportion of the particles having a size is 14 mesh or finer but 36 mesh or rougher is less than 60% by weight, gas cannot be removed sufficiently, thereby causing excessive blow outs As a result, the welding operation cannot be conducted, or the surface of the bead becomes rough, causing the appearance or the performance of easily separating the slag to deteriorate. If the proportion of the particles having a size finer than 36 mesh exceeds 20%, the gas removal feasibility deteriorates, causing seizure of slag to easily take place.

The flux described above exhibits an excellent operation feasibility at the time of welding with a large heat input. Furthermore, it can, of course, be satisfactorily used in a usual groove.

Examples

Example 1

Figure 4A:
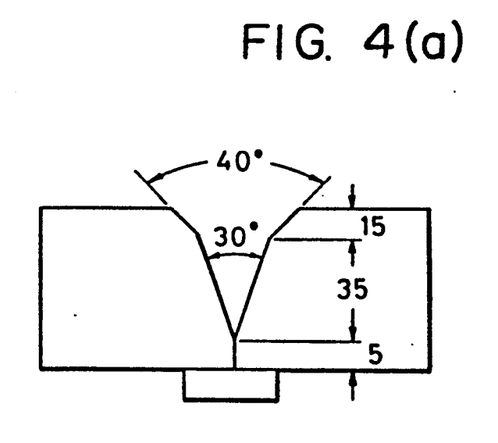
FIG. 4A illustrates the shapes and the dimensions of the multi-angle groove according to Example 1 of the present invention.
Figure 4B:
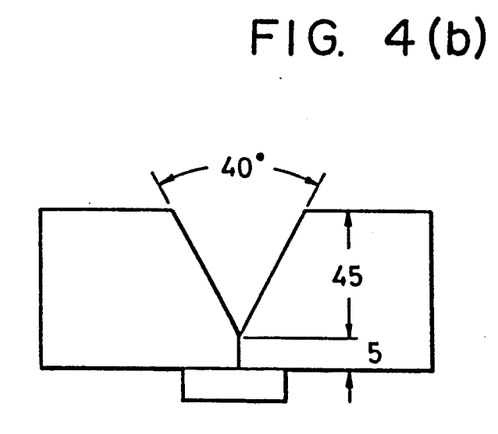
FIG. 4B illustrates those of the conventional groove.

One-pass/single side welding was conducted under the welding conditions shown in Table 3 in accordance with the tandem electrode method by using a steel plate as a test piece whose composition is shown in Table 1, flux whose composition and the particle size distribution are as shown in Table 2, and comsumable electrode containing Mn by 2% by weight. The shapes of the grooves are shown in FIGS. 4A and 4B.

the results of the examples are shown in Table 4.

TABLE 1

| Type | Plate thickness | (%) | | | | | | | |
|---|---|---|---|---|---|---|---|---|---|
| | | C | Si | Mn | P | S | Nb | Ti | N |
| SM50B | 55 mm | 0.16 | 0.28 | 1.35 | 0.010 | 0.002 | 0.012 | 0.008 | 0.0033 |

TABLE 2

| Symbol | (%) | | | | | | | | | | Particle size distribution | | |
|---|---|---|---|---|---|---|---|---|---|---|---|---|---|
| | $SiO_2$ | MgO | CaO | $CaF_2$ | $Al_2O_3$ | $TiO_2$ | Fe | Si | Mn | Others | +14 mesh | −14 to +36 mesh | −36 mesh |
| A | 20.6 | 25.9 | 6.8 | 3.1 | 6.0 | 3.2 | 28.3 | 0.9 | 3.1 | 2.1 | 4.6 | 78.1 | 17.3 |
| B | 19.3 | 25.8 | 5.3 | 11.1 | 8.6 | 3.6 | 18.5 | — | 5.2 | 2.6 | 14.7 | 69.4 | 15.9 |
| C | 18.6 | 36.4 | 7.4 | 3.1 | 5.7 | 2.8 | 20.8 | — | 3.3 | 1.9 | 3.2 | 81.2 | 15.6 |

TABLE 3

| Electrode | Current | Voltage | Welding speed |
|---|---|---|---|
| L | 2100A | 35 V | 20 to 30 cm/min |
| T | 1600A | 48V | | where
L: leading
T: trailing

TABLE 4

| No. | Symbol Groove | Symbol Flux | Appearance of bead | Internal defects | Toughness of the portion influenced by welding heat vEo (bonded portion) | Remarks |
|---|---|---|---|---|---|---|
| 1 | FIG. 4A | A | Good | No defects | 6.2 | Present invention |
| 2 | FIG. 4A | B | Good | No defects | 5.8 | Present invention |
| 3 | FIG. 4A | C | Almost good | No defects | 5.6 | Comparative example |
| 4 | FIG. 4B | A | Good | No defects | 2.4 | Conventional example |

Referring to Table 4, Test Nos. 1 and 2 used the test pieces according to the present invention, in which weld beads of excellent shapes were obtained without any welding defects. On the contrary, Test No. 3 displayed a very narrow bead width and the shape of the end portion was unsatisfactory because the composition of the flux was not in the above-described suitable range.

Test No. 4 was a groove having the conventional shape. Therefore, the cross sectional area of the groove was too large, and the heat input increased. As a result, the toughness of the portions which are influenced by the welding heat was insufficient.

Example 2

Figure 5A:
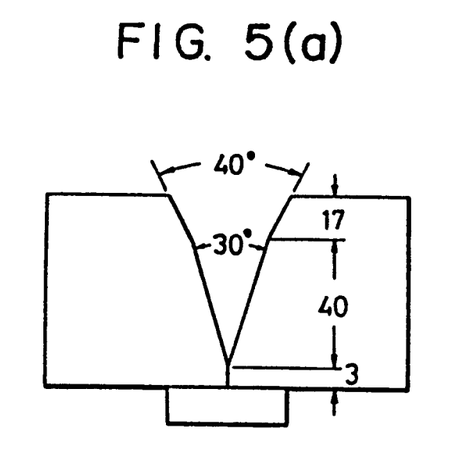
FIG. 5A illustrates the shapes and the dimensions of the multi-angle groove according to Example 2 of the present invention.
Figure 5B:
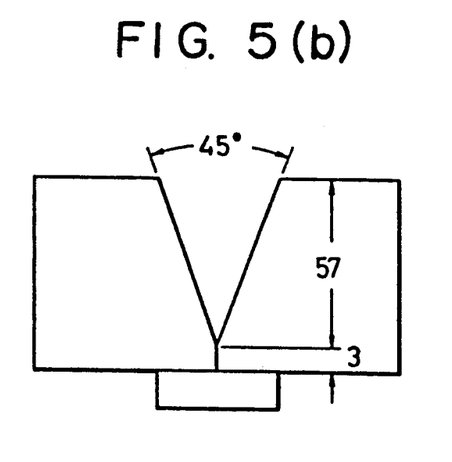
FIG. 5B illustrates those of the conventional groove.

The multi-layer welding was conducted under the welding conditions shown in Table 7 in accordance with the tandem electrode method by using a steel plate as a test piece whose composition is shown in Table 5, flux whose composition and the particle size distribution are shown in Table 6, and electrode containing Mn by 2% by weight. The shapes of the grooves are shown in FIGS. 5A and 5B.

The results of the experiments are shown in Table 8.

Referring to Table 8, Test Nos. 5 to 8 embodied the present invention, with which the welding was completed by two passes and an excellent operation feasibility was displayed. Test No. 9 was an example in which multi-layer welding with a large heat input was conducted by using a conventional groove, in which the slag removal feasibility was unsatisfactory and welding defects occurred. Test Nos. 10 and 11 displayed insufficient working feasibility since the composition of the flux was not in the above-described suitable range. Test No. 12 displayed non-uniform bead shape in the first layer, unsatisfactory slag removal feasibility, and welding defects, because the distribution of the particles of the flux was not in the suitable range. Test No. 13 was an example in which welding was conducted by using a conventional groove. The obtainable working efficiency was extremely insufficient with test No.13.

TABLE 5

| Type | Plate thickness | (%) | | | | | | |
|------|-----------------|------|------|------|-------|-------|-------|--------|
|      |                 | C    | Si   | Mn   | P     | S     | Nb    | Ti    | N |
| SM50B | 60 mm | 0.16 | 0.28 | 1.35 | 0.008 | 0.002 | 0.012 | 0.008 | 0.0033 |

TABLE 6

| Symbol | SiO$_2$ | MgO | CaO | CaF$_2$ | Al$_2$O$_3$ | TiO$_2$ | Fe | Si | Mn | Others | Remarks | Particle size distribution | | |
|--------|------|-----|-----|------|-------|------|------|-----|-----|--------|---------|---------|---------|---------|
|        |      |     |     |      |       |      |      |     |     |        |         | +14 mesh | −14 to +35 mesh | −36 mesh |
| D | 20.6 | 25.9 | 6.8 | 3.1 | 6.0 | 3.2 | 28.3 | 0.9 | 3.1 | 2.1 | Present | 4.6 | 78.1 | 17.3 |
| E | 22.8 | 33.2 | 7.0 | 16.7 | 11.2 | 2.3 | — | 2.1 | 2.5 | 2.2 | invention | 12.3 | 71.8 | 15.9 |
| F | 14.5 | 24.2 | 8.3 | 10.1 | 10.1 | 6.0 | 20.1 | — | 3.4 | 3.3 |  | 2.5 | 83.7 | 13.8 |
| G | 18.4 | 21.3 | 14.3 | 3.1 | 6.1 | 3.2 | 26.2 | 0.8 | 3.2 | 3.4 |  | 12.7 | 62.6 | 24.7 |
| H | 20.2 | 14.6 | 8.6 | 10.1 | 13.8 | 4.0 | 20.4 | 1.3 | 4.5 | 2.6 | Com- | 9.4 | 73.5 | 17.1 |
| I | 18.5 | 21.4 | 6.5 | 2.7 | 6.3 | — | 36.3 | 1.2 | 3.1 | 4.0 | parative | 1.5 | 87.3 | 11.2 |
| J | 15.1 | 26.7 | 8.2 | 9.4 | 10.9 | 5.2 | 1.73 | 0.8 | 3.3 | 3.1 | example | 23.8 | 50.2 | 26.0 |

TABLE 7

| Symbol | Pass | Electrode | Current | Voltage | Speed | Heat input |
|--------|------|-----------|---------|---------|-------|------------|
| W-1 | 1 | L | 2100A | 38 V | 25 to | 313 to 376 |
|     |   | T | 1600A | 48 V | 30 cm/min | kj/cm |
|     | 2 | L | 1700A | 42 V | 25 to | 303 to 363 |
|     |   | T | 1600A | 50 V | 30 cm/min | kj/cm |
| W-2 | 1 to 5 | L | 1600A | 36 V | 40 | 183 |
|     |   | T | 1400A | 46 V | cm/min | kj/cm |

TABLE 8

| No. | Symbol Flux | Symbol Groove | Welding Condition | Initial slag separation | Appearance of bead | Internal defects | Number of passes | Remarks |
|-----|------|--------|-------------------|-------------------------|--------------------|------------------|------------------|---------|
| 5 | D | FIG. 5A | welding speed W-1 (30, 30) | good | good | no defects | 2 | present invention |
| 6 | E | FIG. 5A | W-1 (25, 25) | good | good | no defects | 2 |  |
| 7 | F | FIG. 5A | W-1 (30, 28) | good | good | no defects | 2 |  |
| 8 | G | FIG. 5A | W-1 (30, 30) | good | good | no defects | 2 |  |
| 9 | D | FIG. 5B | W-1 (30, 30) | inferior | good | slag caught | 3 | Comparative example |
| 10 | H | FIG. 5A | W-1 (30, 28) | no good | no good | no defects | 2 |  |
| 11 | I | FIG. 5A | W-1 (30, 30) | no good | no good | slag caught | 2 |  |
| 12 | J | FIG. 5A | W-1 (30, 28) | no good | no good | slag caught | 2 |  |
| 13 | F | FIG. 5B | W-2 | good | good | no defect | 7 | Conventional |

TABLE 8-continued

| No. | Symbol Flux | Groove | Welding Condition | Initial slag separation | Appearance of bead | Internal defects | Number of passes | Remarks |
|---|---|---|---|---|---|---|---|---|
| | | | (40) | | | | | example |

Example 3

Figure 6A:
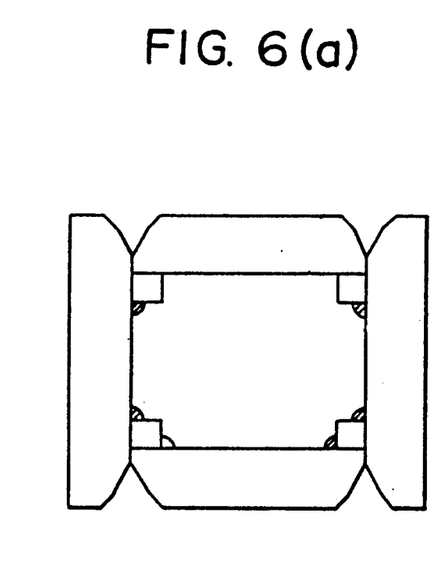
FIG. 6A is a schematic view which illustrates a state in which the multi-angle groove according to the present invention is applied to a box column.
Figure 6B:
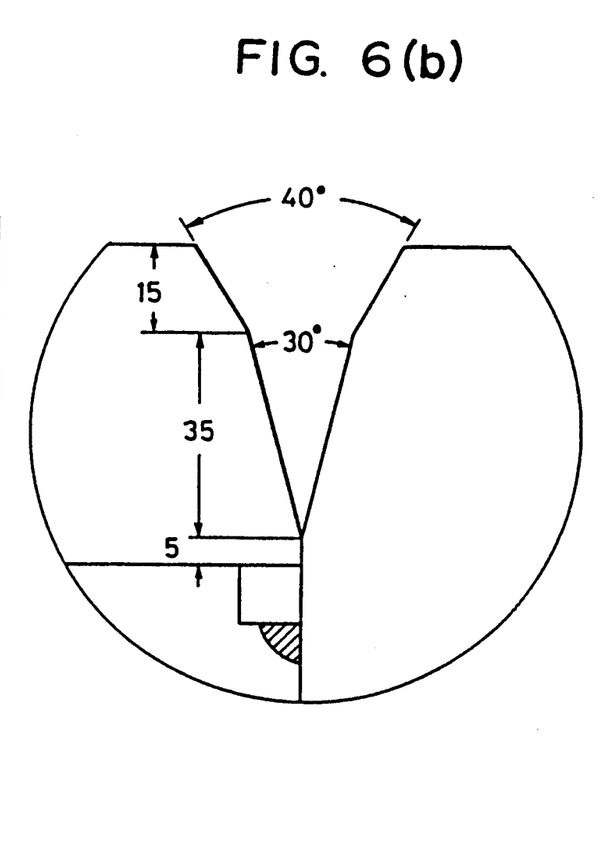
FIG. 6B is an enlarged view of the multi-angle groove shown in FIG. 6A.

The corner portions of a box column having a cross sectional shape as shown in FIG. 6 has one-pass/ single layer welded under the welding conditions shown in Table 11 by using a steel plate whose composition is shown in Table 9, flux whose composition and the particle size distribution is shown in Table 10, and electrode containing Mn by 2% by weight. The results of the examples are as shown in Table 12.

Referring to Table 12, Test No. 14 embodying the present invention, the weld bead form having a good shape was obtained. Test No. 15 displayed a too narrow head width, and a partial defective welding was generated in the groove on the surface of the steel since the composition of the flux was not in the above-described suitable range.

TABLE 12-continued

| No. | Symbol for flux | Welding feasibility | Appearance of bead | remarks |
|---|---|---|---|---|
| 15 | C | good | the width of bead too short (welding defects taken place) | Comparative example |

Example 4

Figure 7A:
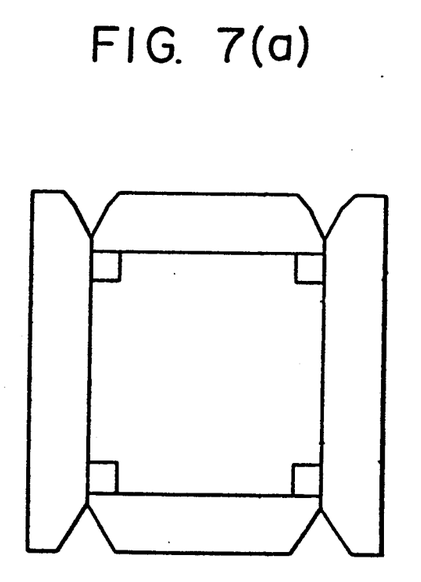
FIG. 7A is a schematic view which illustrates a state in which a box column is welded.

The corner portions of a box column, whose cross sectional shape is shown in FIG. 7, was multi-layer welded under the welding conditions shown in Table 15 by using a steel plate, whose composition is shown in Table 13, flux whose composition and the particle size distribution are shown in Table 14, and electrode containing Mn by 2% by weight. The results of the examples are shown in Table 16.

Referring to Table 16, Test No. 16, embodying the onepass/single layer welding according to the present invention, satisfactory results were obtained. Test No. 17, according to the conventional groove, displayed internal defects with the shown thickness although the flux according to the present invention was used. In Test No. 18, serving as a comparative example using the conventional groove, the slag removal performance was unsatisfactory, and cracks occurred in the solidified portions.

TABLE 9

| Type | Plate thickness | C | Si | Mn | P | S | Nb | Ti | N |
|---|---|---|---|---|---|---|---|---|---|
| | | | | (%) | | | | | |
| SM50B | 55 mm | 0.16 | 0.28 | 1.35 | 0.010 | 0.002 | 0.012 | 0.008 | 0.0033 |

TABLE 10

| Symbol | SiO$_2$ | MgO | CaO | CaF$_2$ | Al$_2$O$_3$ | TiO$_2$ | Fe | Si | Mn | Others | Particle size distribution | | |
|---|---|---|---|---|---|---|---|---|---|---|---|---|---|
| | | | | (%) | | | | | | | +14 mesh | −14 to +36 mesh | −36 mesh |
| A | 20.6 | 25.9 | 6.8 | 3.1 | 6.0 | 3.2 | 28.3 | 0.9 | 3.1 | 2.1 | 4.6 | 78.1 | 17.3 |
| C | 18.6 | 36.4 | 7.4 | 3.1 | 5.7 | 2.8 | 20.8 | — | 3.3 | 1.9 | 3.2 | 81.2 | 15.6 |

TABLE 11

| Electrode | Current | Voltage | Welding speed |
|---|---|---|---|
| L | 2100A | 35 V | 20 to 30 cm/min |
| T | 1600A | 48V | |

TABLE 12

| No. | Symbol for flux | Welding feasibility | Appearance of bead | remarks |
|---|---|---|---|---|
| 14 | A | good | good | present invention |

TABLE 13

| Type | Plate thickness | C | Si | Mn | P | S | Nb | Ti | N |
|---|---|---|---|---|---|---|---|---|---|
| | | | | (%) | | | | | |
| SM50B | 65 mm | 0.15 | 0.40 | 1.46 | 0.008 | 0.002 | 0.015 | 0.010 | 0.0042 |

TABLE 14

| Symbol | SiO$_2$ | MgO | CaO | CaF$_2$ | Al$_2$O$_3$ | TiO$_2$ | Fe | Si | Mn | Others | Particle size distribution | | |
|---|---|---|---|---|---|---|---|---|---|---|---|---|---|
| | | | | (%) | | | | | | | +14 mesh | −14 to +36 mesh | −36 mesh |
| D | 20.6 | 25.9 | 6.8 | 3.1 | 6.0 | 3.2 | 28.3 | 0.9 | 3.1 | 2.1 | 4.6 | 78.1 | 17.3 |

TABLE 15

| Symbol | Pass | Electrode | Current | Voltage | Speed | Heat input |
|---|---|---|---|---|---|---|
| W-3 | 1 | L | 2300A | 38 V | 24 cm/min | 435 kj/cm |
| | | T | 1800A | 48 V | | |

TABLE 15-continued

| Symbol | Pass | Electrode | Current | Voltage | Speed | Heat input |
|---|---|---|---|---|---|---|
| W-4 | 1 | L | 2300A | 38 V | 18 | 579 |
|  |  | T | 1800A | 48 V | cm/min | kj/cm |
| W-5 | 1 | L | 2100A | 38 V | 25 to | 313 to |
|  |  | T | 1600A | 48 V | 30 cm/min | 376 kj/cm |
|  | 2 to 4 | L | 1700A | 42 V | 25 to | 260 to |
|  |  | T | 1600A | 50 V | 35 cm/min | 363 kj/cm |

TABLE 16

Figure 7B:
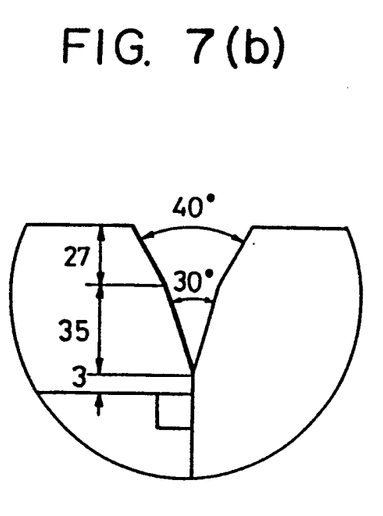
FIGS. 7B and 7C are enlarged views which illustrate the shapes and the dimensions of the multi-angle groove according to the present invention and those of the conventional groove.
Figure 7C:
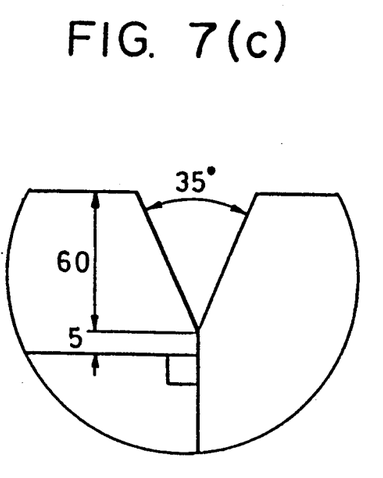

| No. | Symbol Groove | Symbol Welding condition | Separation feasibility of initial slag | internal defect | appearance of bead |
|---|---|---|---|---|---|
| 16 | FIG. 7B | W-3 | — | no defect | good |
| 17 | FIG. 7C | W-4 | — | welding defect | good |
| 18 | FIG. 7B | W-5 | good | no defect | good |
| 19 | FIG. 7C | W-5 | no good | cracks taken place | good |

As described above, according to the welding method embodying the present invention, the one-pass welding can be further widely employed and the number of passes required at the multi-layer welding can be reduced. Therefore, the single side welding of thick steel plates can be significantly efficiently conducted. In particular, submerged arc welding can be efficiently conducted when the member, having a long welding line such as the corner of the box column, is welded.

What is claimed is:

1. A method of arc welding of thick steel plates with a large heat input and flux for submerged arc welding which comprises:

forming a groove having a multi-angle shape which has at least two different angular inclinations when a single side submerged arc welding for perfect penetration is conducted under a condition of an welding heat input of 100 to 1000 kJ/cm; using submerged arc welding flux composed by $SiO_2$: 5 to 28% by weight,
MgO: 15 to 35% by weight,
CaO: 5 to 15% by weight,
$CaF_2$: 2 to 20% by weight,
$Al_2O_3$: 5 to 15% by weight, and
$TiO_2$: 2 to 10% by weight as the main components, and containing iron powder by 30 % by weight or less and either or both of Si and Mn in the metallic form by 10 % by weight, said submerged arc welding flux having a particles size distribution arranged such that the proportion of the particles which have a size finer than 36 mesh is 20 % by weight or less and the proportion of the particles which have a size 14 mesh or finer but 36 mesh or rougher is 60 % by weight or more; and conducting said welding.

2. A method of submerged arc welding thick steel plates with a large heat input according to claim 1, wherein a joint is obtained by one-pass/single side welding.

3. A method of submerged arc welding thick steel plates with a large heat input according to claim 1, wherein a joint is obtained by multi-layer/single side welding.

* * * * *